(12) United States Patent
Criswell et al.

(10) Patent No.: US 7,537,707 B2
(45) Date of Patent: May 26, 2009

(54) GAS INJECTOR AND METHOD THEREFOR

(76) Inventors: Gary J. Criswell, 5041 E. Kirkland Rd., Phoenix, AZ (US) 85054; Kenneth G. Criswell, 1545 Aylesbury Land, Plano, TX (US) 75075

( * ) Notice: Subject to any disclaimer, the term of this patent is extended or adjusted under 35 U.S.C. 154(b) by 66 days.

(21) Appl. No.: 11/684,408

(22) Filed: Mar. 9, 2007

(65) Prior Publication Data

US 2007/0216043 A1    Sep. 20, 2007

Related U.S. Application Data

(60) Provisional application No. 60/781,023, filed on Mar. 10, 2006, provisional application No. 60/792,272, filed on Apr. 14, 2006.

(51) Int. Cl.
*C02F 1/68* (2006.01)
*B01F 3/04* (2006.01)

(52) U.S. Cl. .................. 210/765; 210/749; 210/167.11; 210/220; 210/416.2; 261/76

(58) Field of Classification Search .................. 210/749, 210/764, 765, 136, 167.1, 167.11, 167.12, 210/167.3, 198.1, 205, 209, 220, 416.1, 416.2; 261/76, 77, 119.1, 121.1; 417/423.9, 434
See application file for complete search history.

(56) References Cited

U.S. PATENT DOCUMENTS 3,637,331 A  *   1/1972   Smith et al. .............. 210/416.1

* cited by examiner

*Primary Examiner*—Matthew O Savage
*Assistant Examiner*—Lucas Stelling
(74) *Attorney, Agent, or Firm*—Veronica-Adele R. Cao; Weiss & Moy, P.C.

(57) ABSTRACT

A gas injector that is coupled to the pump strainer basket housing drain port of a pump-circulated system is disclosed. The gas injector that may be installed in a way that is less invasive than currently used gas injection systems to pre-existing plumbing of a pump system and that allows for more efficient gas absorption in water than currently used gas injection systems. The gas injector may be used with all currently existing pump systems.

15 Claims, 3 Drawing Sheets

GAS INJECTOR AND METHOD THEREFOR

CROSS-REFERENCE TO RELATED APPLICATIONS

This non-provisional application claims priority to U.S. Provisional Application No. 60/781,023 filed on Mar. 10, 2006 in the name of the Applicants of the present invention. This non-provisional application also claims priority to U.S. Provisional Application No. 60/792,272 filed on Apr. 14, 2006 in the name of the Applicants of the present invention.

FIELD OF THE INVENTION

This invention relates generally to pool water pH control systems and, more specifically, to a gas injector that allows for the improved injection of gas into pump-circulated water.

BACKGROUND OF THE INVENTION

For any pump-circulated water, it is important to maintain proper pH levels to prevent the growth of bacteria and other pathogens, and to ensure that the water is not toxic or corrosive to any items, animals or persons coming into contact with the water.

One example of pump-circulated water is swimming pool water. Pool water pH is a measure of its total acid-alkalinity balance, i.e. the relative proportion of acids and alkalis in the water. If water is too acidic, it will cause corrosion of metal equipment and can cause skin irritation. If the water is too alkaline, it can cause scaling on the pool surface and can cloud the water. Furthermore, high acidity and high alkalinity may alter the effectiveness of the chlorine in the water.

Muriatic acid or sodium bisulfate are often used to lower the pool water pH. However, the use of acid proves to be inconvenient because people are prohibited from using the pool until the acid has been given a chance to mix with the pool water. Gas injectors allow for better absorption of gas (e.g. $CO_2$), which in turn helps to control the pool water pH. If these gas injectors are used to control the pool water pH, there is no longer a need for the use of acid.

Currently, gas is used in some large public pools to control pool water pH. However, in order to do this, the original plumbing must be cut. Once the original piping is cut, a union is placed on but sides of the cut piping and a new section defining a port is welded into place. The port usually has a ⅛ inch barb fitting that couples to tubing leading to a gas cylinder. Typically these modifications are done at the water inlet to the pump strainer basket housing, at the water outlet from the pump, and/or at the water outlet from the filter. To cut the existing piping at these points is very invasive to the original plumbing and oftentimes leads to leaks. These leaks then cause a pool owner to expend more time and money on maintenance of the pump system.

Therefore, a need exists for a gas injector that may be installed in a way that is less invasive than currently used systems. A further need exists for a gas injector that allows for more efficient gas absorption in water. Preferably, the gas injector is coupled to the pump strainer basket housing drain port. Further preferably, the gas injector may be used with all currently existing pump systems.

SUMMARY OF THE INVENTION

It is an object of the present invention to provide a gas injector that may be installed in a way that is less invasive than currently used gas injection systems to the pre-existing plumbing of a pump system.

It is another object of the present invention to provide a gas injector that allows for more efficient gas absorption in water than currently used gas injection systems.

It is still another object of the present invention to provide a gas injector that is coupled to the pump strainer basket housing drain port.

It is still another object of the present invention to provide a gas injector that may be used universally with all currently existing pump systems.

BRIEF DESCRIPTION OF THE PREFERRED EMBODIMENTS

In accordance with one embodiment of the present invention, a gas injector system is disclosed. The gas injector comprises a hollow body, a connector coupled to a proximal end of the hollow body, a valve chamber coupled to a distal end of the connector and housed within the hollow body, a backflow prevention valve housed within the valve chamber, and a sintered diffusion insert coupled to a distal end of the backflow prevention valve.

In accordance with another embodiment of the present invention, a gas injector is disclosed. The gas injector comprises a hollow body having a threaded distal end and a flange coupled proximate the threaded distal end, the distal end being approximately 0.35 inches long, ¼ NPT, and having a width that tapers from approximately 0.525 inch to approximately 0.5 inch; a connector coupled to a proximal end of the hollow body, the connector having a threaded distal end for engaging a threaded aperture defined by a proximal end of the hollow body; a valve chamber coupled to a distal end of the connector and housed within the hollow body; an umbrella valve housed within the valve chamber; and a sintered diffusion insert coupled to a distal end of the umbrella valve, wherein the sintered diffusion insert has a diameter of approximately 0.25 inch and wherein a distal end of the sintered diffusion insert protrudes out of the threaded distal end of the hollow body by approximately 0.35 inch.

In accordance with another embodiment of the present invention, a method for injecting gas into pump circulated-water is disclosed. The method comprises the steps of: providing a gas injector comprising: a hollow body; a connector coupled to a proximal end of the hollow body; a valve chamber coupled to a distal end of the connector and housed within the hollow body; a backflow prevention valve housed within the valve chamber; and a sintered diffusion insert coupled to a distal end of the backflow prevention valve; coupling a proximal end of the connector to a gas delivery mechanism and coupling a distal end of the hollow body of the gas injector to a pump strainer basket housing drain port; releasing gas from the gas delivery mechanism and through the gas injector; diffusing the gas by passing it through the sintered diffusion insert; blending the diffused gas with water that enters into the pump strainer basket housing; passing the diffused gas and water through a pump impellar and into a filter; and passing the diffused gas and water out of the filter.

The foregoing and other objects, features, and advantages of the invention will be apparent from the following, more particular, description of the preferred embodiments of the invention, as illustrated in the accompanying drawings.

DETAILED DESCRIPTION OF THE PREFERRED EMBODIMENTS

Figure 1:
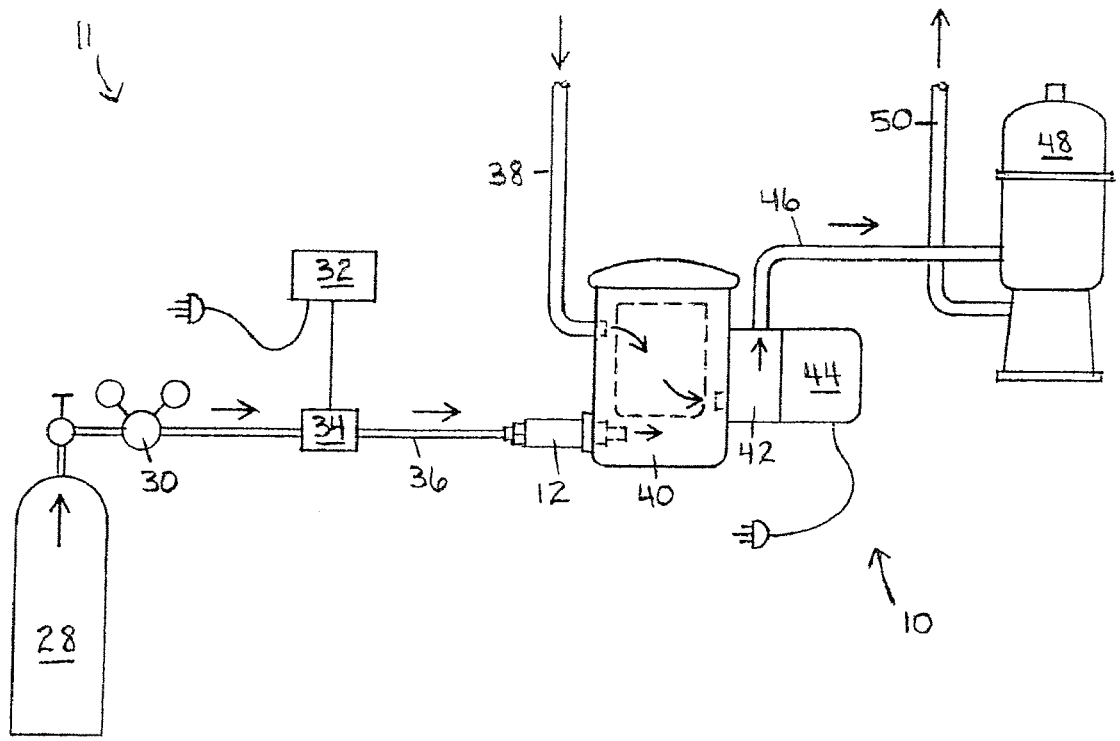
FIG. 1 is a diagram of a gas injection system of the present invention shown coupled to a standard delivery mechanism.
Figure 2:
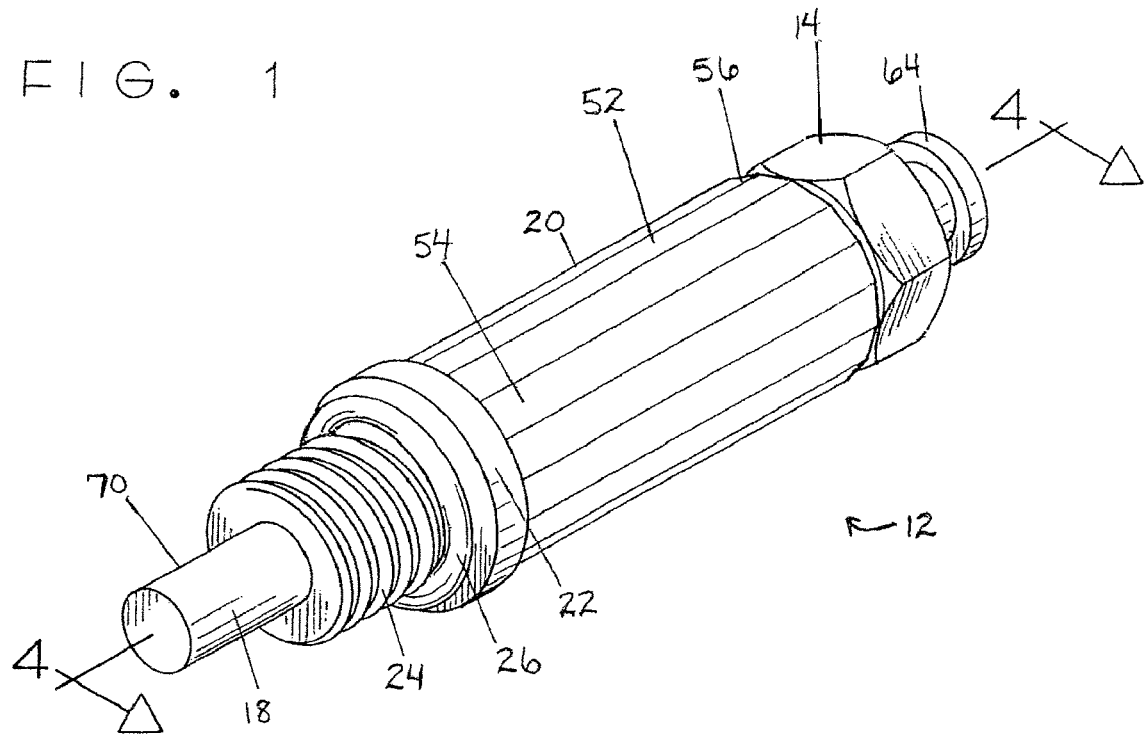
FIG. 2 is a perspective view of a gas injector of the system of FIG. 1.
Figure 3:
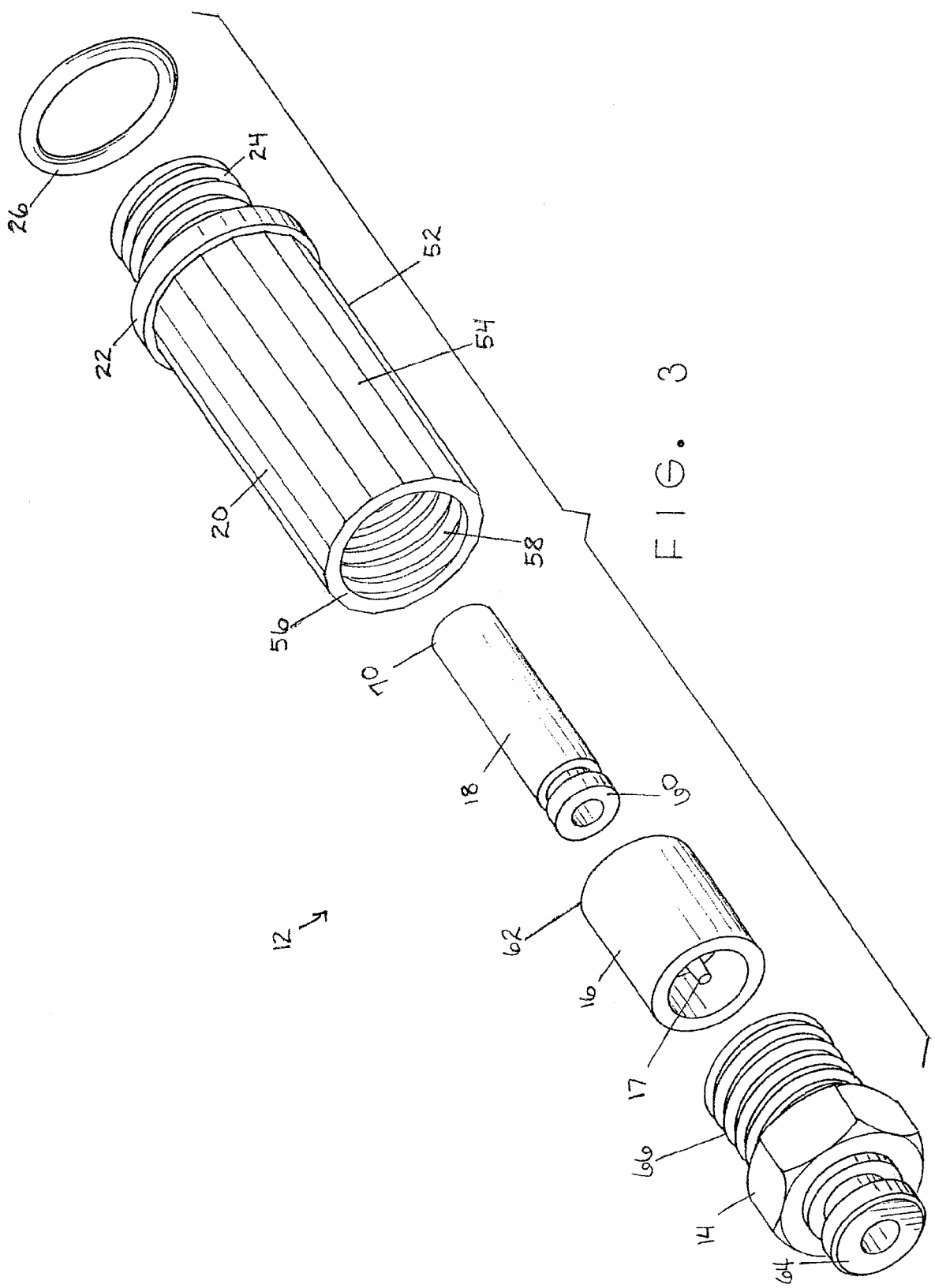
FIG. 3 is an exploded perspective view of the gas injector of FIG. 2.
Figure 4:
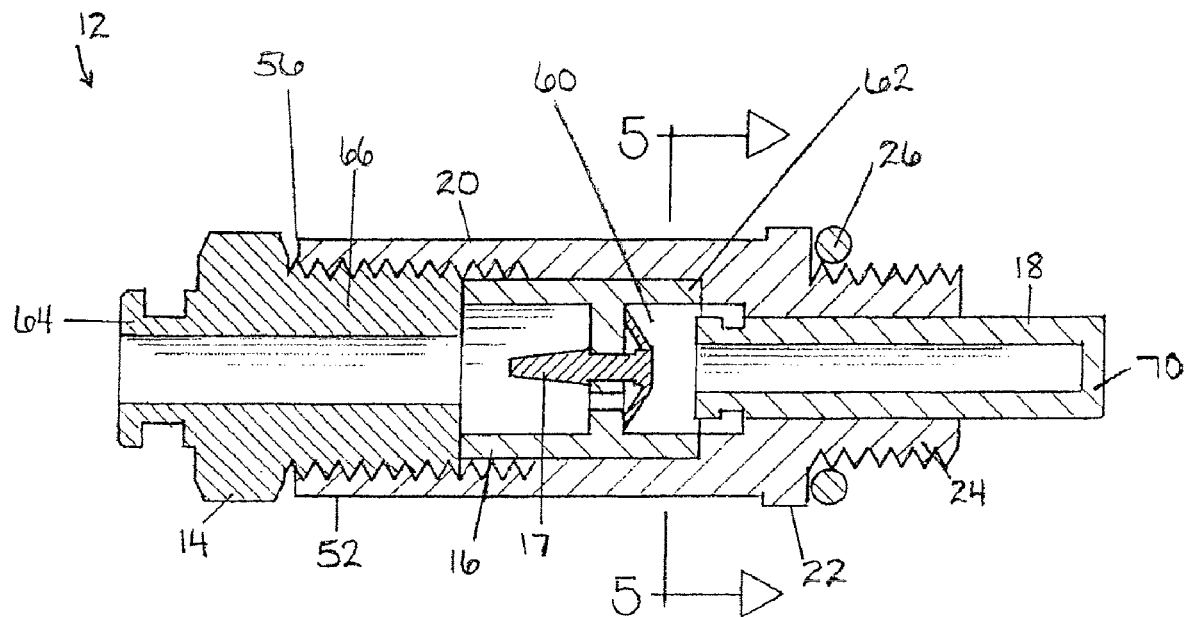
FIG. 4 is a side cross-sectional view of the gas injector of FIG. 2.
Figure 5:
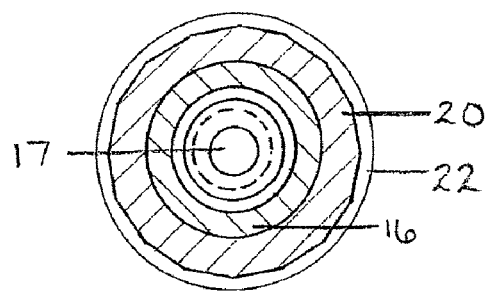
FIG. 5 is a cross-sectional view of FIG. 4, taken along lines 5-5.

The novel features believed characteristic of the invention are set forth in the appended claims. The invention will best be understood by reference to the following detailed description of illustrated embodiments when read in conjunction with the accompanying drawings, wherein like reference numerals and symbols represent like elements.

FIGS. 1-5 show a system 10 using the gas injector 12 of the present invention. The gas injector 12 comprises a hollow body 20, a connector 14, a backflow prevention valve 17 within a valve chamber 16, and a sintered diffusion insert 18.

Referring to FIG. 1, the system 10 is shown used with a prior art gas delivery mechanism 11. The prior art gas delivery mechanism 11 typically comprises a gas cylinder 28, a pressure regulator 30, a timer 32, a solenoid valve 34, and delivery tubing. The system 10 of the present invention comprises the gas injector 12, a pump strainer basket housing 40, a pump impeller 42, a pump motor 44, and a filter 48. Piping or tubing is used for the gas inlet 36 to the pump strainer basket housing 40, the water inlet 38 to the pump strainer basket housing 40, the water outlet 46 from the pump impellar 42, and the water outlet 50 from the filter 48.

Referring now to FIGS. 2-5, the gas injector 12 has a hollow body 20 that may be made of acrylic, plastic, metal, or any other suitable rigid material. Although the hollow body 20 is shown as being substantially cylindrical, it should be clearly understood that substantial benefit may be derived from the hollow body 20 being square, rectangular, or triangular. It is preferable that the hollow body 20 has an outer surface 52 that has at least two flat sides 54 that will allow a person to use his/her hand or a wrench to rotate the hollow body 20 when attaching it to pump strainer basket housing 40. It should also be understood that substantial benefit may nevertheless be derived from a completely smooth outer surface 52.

The hollow body 20 preferably has a proximal end 56 that defines a threaded aperture 58 and has a threaded distal end 24. The threaded distal end 24 helps to facilitate male-to-female engagement of the gas injector 12 to the pump strainer basket housing 40. It is also preferable, though not required, that the hollow body 20 also have a flange 22 proximate the threaded distal end 24. In order to fit most commercially available pumps, it is preferred that the threaded distal end 24 be approximately 0.35 inches long, ¼ NPT (National Pipe Thread), and have a width that tapers from approximately 0.525 inch to approximately 0.5 inch. It is also preferred that the flange 22 have a diameter of approximately 0.688 inch and a width of approximately 0.1 inch. It should be clearly understood that while these dimensions are preferred for universal installation capability, substantial benefit may be derived from the threaded distal end 24 and flange 22 having different dimensions and/or from there being no flange 22 at all.

An O-ring 26 may also be used to help seal the connection of the threaded distal end 24 to the pump strainer basket housing 40. The O-ring 26 is preferably dimensioned to be coupled about the threaded distal end 24 proximate the flange 22 to help prevent air leaks at the suction side of the pump.

The connector 14 preferably has a threaded distal end 66 dimensioned to engage the threaded aperture 58 defined by the proximal end 56 of the hollow body 20. While it is preferred that the threaded distal end 66 of the connector 14 and the threaded aperture 58 of the proximal end 56 of the hollow body 20 be ¼ NTP, it should be clearly understood that substantial benefit may be derived from a different size thread. The connector 14 also preferably has a quick-connect proximal end 64. The quick-connect proximal end 64 is preferably a smooth slip-connect fitting for high-pressure hose. It should also be clearly understood that the quick-connect proximal end 64 could also be a barbed flange-type connection. While it is preferred that the quick-connect proximal end 64 be dimensioned to connect to 5/32 inch tubing, it should be clearly understood that any other size tubing may be used as long as the tubing is the same size as (or only slightly larger than) the aperture inside the pressure regulator 30.

A valve chamber 16 is coupled to a distal end 66 of the connector 14 and is housed within the hollow body 20. And a backflow prevention valve 17 is housed within the valve chamber 16. When gas flow stops, the backflow prevention valve 17 keeps water from returning to the pressure regulator 30 and the gas cylinder 28 and causing damage. The backflow prevention valve 17 is preferably an umbrella valve, but it should be clearly understood that substantial benefit may still be derived from the use of a duck-bill type valve, a ball-type valve, a piston-type check valve, or any other suitable valve or backflow prevention device. It is also preferred that the backflow prevention valve 17 be made of rubber, plastic or some other suitable material that is both pliable and waterproof.

The sintered diffusion insert 18 has a quick-connect proximal end 60 that is coupled to a distal end 62 of the backflow prevention valve 17. In order to universally fill all available pumps, it is preferred that the sintered diffusion insert 18 has a diameter of approximately 0.25 inch and that a distal end 70 of the sintered diffusion insert 18 protrudes out of the threaded distal end 24 of the hollow body 20 by approximately 0.35 inch. However, it should be clearly understood that substantial benefit may be derived from the sintered diffusion insert 18 having different dimensions. And while the sintered diffusion insert 18 is shown as being substantially cylindrical, it should be clearly understood that substantial benefit may be derived from the sintered diffusion insert 18 being square, hexagonal, or rectangular or any other shape. Preferably, the sintered diffusion insert 18 is made of ceramic, sand, bonded glass bead, or any other suitable porous material.

Statement of Operation

When using a typical gas delivery mechanism 11, the solenoid valve 34 is attached to an open outlet port in the gas pressure regulator 30. The gas pressure regulator 30 is then attached to a gas cylinder 28. While it is preferred that the gas cylinder be filled with $CO_2$, it should be clearly understood that substantial benefit may be derived from the use of chlorine gas or any other gas that helps to control pH levels. Further preferably, the minimum cylinder capacity is 20 lbs; however, any size cylinder 28 may be used. Gas deliver pressure at the pressure regulator 30 is preferably set at approximately 30 psi, but it may be anywhere in between 20 psi and 40 psi. Gas flow may also be regulated by a volume regulator (not shown) or needle valve (not shown). The power supply wiring from the solenoid valve 34 to the timer 32. The solenoid valve 34 may be either AC or DC as determined by the timer. Also, it is preferable that the solenoid valve 34 be configured as normally "closed," however, it may be configured normally at "open." Gas delivery tubing is then used to connect the solenoid valve 34 to the gas injector 12.

The circulation pump drain plug is removed and the gas injector 12 is preferably installed in the pump strainer housing drain port located at the bottom of the pump strainer basket housing 40. This is the preferred injection site because it facilitates rapid gas saturation while mixing with the water passing through the pump strainer basket housing 40. Also, this injection site is non-intrusive and offers ease of installation as compared to rerouting or disturbing existing plumbing. Gas injection at this site is efficient and cost-effective.

As $CO_2$ passes through the sintered diffusion insert 18, it is reduced to very tiny bubbles. Since these tiny bubbles are injected in the bottom of the pump strainer basket housing 40, they want to rise upon entering the water. The water inlet 38 to the pump strainer basket housing 40 is located in the top of the pump strainer basket housing 40 and the water naturally wants to drop upon entering the pump strainer basket housing 40. The pump impeller 42 inlet is located in the middle of the pump strainer basket housing 40. The net result is the collision of the tiny bubbles and the water in the pump strainer basket housing 40 before they are rapidly pulled into the pump impeller 42. This process improves $CO_2$ absorption.

As the water and the tiny bubbles of $CO_2$ are pulled through the pump impeller 42 they are blended together. This blending process also improves the $CO_2$ absorption.

The Diffusion Bell concept is a diffusion/absorption concept used by aquarists in the maintenance of aquariums. It states that air trapped in the top of a bell placed at the bottom of an aquarium will eventually be absorbed by the water. A swimming pool filter works in the same manner. While the pump is running, there is constant pressure on the inside of the filter 48. In the present invention, any $CO_2$ that is unabsorbed in the diffusion or blending steps will be caught at the top of the filter 48 and will eventually be absorbed by the water.

A timer 32 may be used to open the solenoid valve 34 during the normal operating schedule of the water circulation pump so as to deliver sufficient gas volume to reduce pH to the desired range. The preferred solenoid valve 34 operation controller is a programmable timer. However, solenoid valve 34 operation may be controlled by a manual on/off switch or a computer controlled pH sensor.

While the invention has been particularly shown and described with reference to preferred embodiments thereof, it will be understood by those skilled in the art that the foregoing and other changes in form and details may be made therein without departing from the spirit and scope of the invention.

We claim:

1. A method for controlling pH of pump-circulated water comprising the steps of:
    providing a gas injector comprising:
        a hollow body;
        a connector coupled to a proximal end of the hollow body;
        a valve chamber coupled to a distal end of the connector and housed within the hollow body;
        a backflow prevention valve housed within the valve chamber; and
        a sintered diffusion insert coupled to a distal end of the backflow prevention valve;
    coupling a proximal end of the connector to a gas delivery mechanism and coupling a distal end of the hollow body of the gas injector to a pump strainer basket housing drain port;
    releasing gas from the gas delivery mechanism and through the gas injector;
    diffusing the gas by passing it through the sintered diffusion insert;
    blending the diffused gas with water that enters into the pump strainer basket housing;
    passing the diffused gas and water through a pump impeller and into a filter;
    passing the diffused gas and water out of the filter.

2. The method of claim 1 wherein the gas is $CO_2$.

3. The method of claim 1 wherein water enters a top portion of the pump strainer basket housing and wherein the diffused gas enters a bottom portion of the pump strainer basket housing.

4. The method of claim 1 wherein any gas collecting at a top portion of the filter is absorbed by the water in the filter.

5. A method for controlling pH of pump circulated water comprising the steps of:
    injecting gas into a pump strainer basket housing drain port;
    blending the gas with water that enters into the pump strainer basket housing;
    passing the gas and water through a pump impellar;
    absorbing the gas by the water within the pump impellar;
    passing the gas and water into a filter; and
    passing the diffused gas and water out of the filter.

6. The method of claim 5 further comprising the step of absorbing the gas by the water within the filter.

7. The method of claim 5 further comprising the step ef providing a gas injector to inject the gas into the pump strainer basket housing.

8. The method of claim 7 wherein the gas injector comprises.:
    a hollow body;
    a connector coupled to a proximal end of the hollow body;
    a valve chamber coupled to a distal end of the connector and housed within the hollow body;
    a backflow prevention valve housed within the valve chamber; and
    a sintered diffusion insert coupled to a distal end of the backflow prevention valve.

9. The method of claim 5 further comprising the step of diffusing gas as it is delivered into a pump system, wherein the step of diffusing gas comprises the steps of:
    providing a gas injector comprising:
        a hollow body;
        a valve chamber coupled to one end of the connector and housed within the hollow body;
        a backflow prevention valve housed within the valve chamber; and
        a sintered diffusion insert coupled to one end of the backflow prevention valve;
    coupling the gas injector to the pump system;
    releasing gas into the pump system through the gas injector; and
    creating bubbles of gas as the gas flows through the sintered diffusion insert.

10. The method of claim 9 wherein the step of coupling the gas injector to the pump system comprises the step of coupling the gas injector to a drain port located at a bottom portion of the pump strainer basket housing.

11. The method of claim 5 wherein the step of blending the gas with water in the pump system comprises the steps of:
    connecting a gas injector to a drain port located at a bottom portion of the pump strainer basket housing;
    injecting gas into the pump strainer basket housing through the drain port;

delivering water into the pump strainer basket housing through an inlet located at a top portion of the pump strainer basket housing;

mixing the gas with the water in the pump strainer basket housing;

pulling the gas and water through the pump impeller.

12. The method of claim 5 further comprising the step of collecting any unabsorbed gas exiting from the pump impeller within a top portion of the filter above the water in the filter to promote further absorption of the gas into the water.

13. The method of claim 5 wherein the gas is $CO^2$.

14. A method for controlling pH of pump-circulated water comprising the steps of:
providing a pump system comprising:
a gas injector;
a pump strainer basket housing;
a pump impeller;
a pump motor;
a filter; and
delivery tubing; providing a gas injector comprising:
a hollow body;
a connector coupled to a proximal end of the hollow body;
a valve chamber coupled to a distal end of the connector and housed within the hollow body;
a backflow prevention valve housed within the valve chamber; and
a sintered diffusion insert coupled to a distal end of the backf low prevention valve;
coupling the gas injector to a drain port at a bottom portion of the pump strainer basket housing;
injecting gas into the pump strainer basket housing through the gas injector;
delivering water into the pump strainer basket housing through an inlet in a top portion of the pump strainer basket housing;
mixing the gas with the water inside the pump strainer basket housing;
pulling the gas and water through the pump Impeller;
collecting any unabsorbed gas exiting the pump impeller within a top portion of the filter above water collected in the filter to promote further absorption of the gas into the water.

15. The method of claim 14 wherein the gas is $CO_2$.

* * * * *